H. W. BLAKE.
CAR TRUCK.
APPLICATION FILED NOV. 23, 1909.
976,843.
Patented Nov. 29, 1910.
4 SHEETS—SHEET 1.
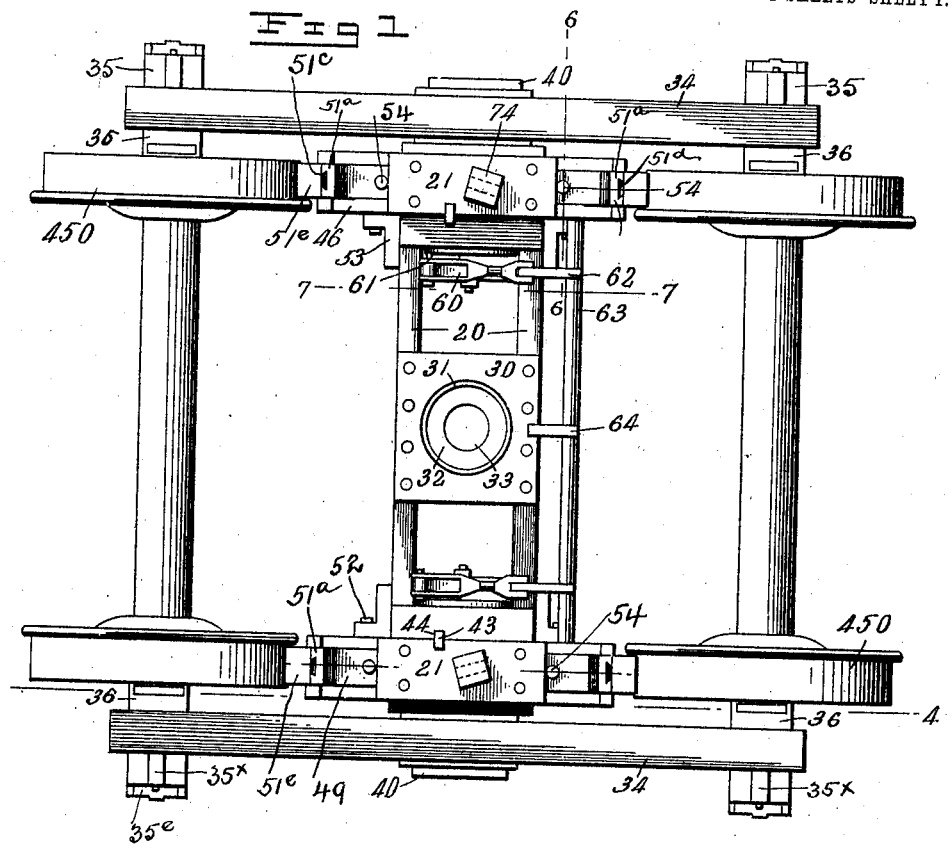
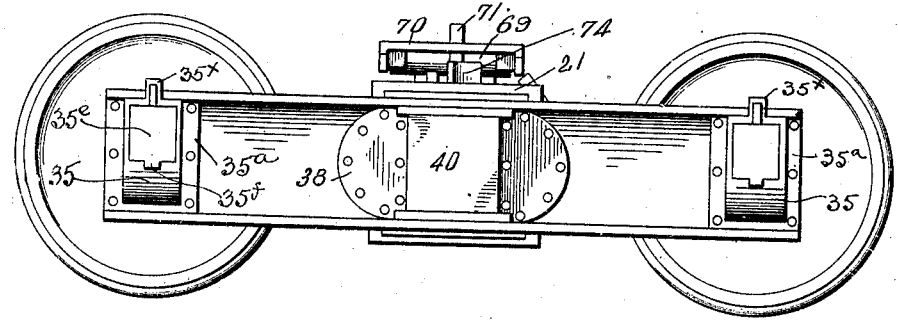
Witnesses
H. C. Robinette
Horace G. Deitz
Inventor
H. W. Blake
By
Attorney H. W. BLAKE.
CAR TRUCK.
APPLICATION FILED NOV. 23, 1909.
976,843.
Patented Nov. 29, 1910.
4 SHEETS—SHEET 2.
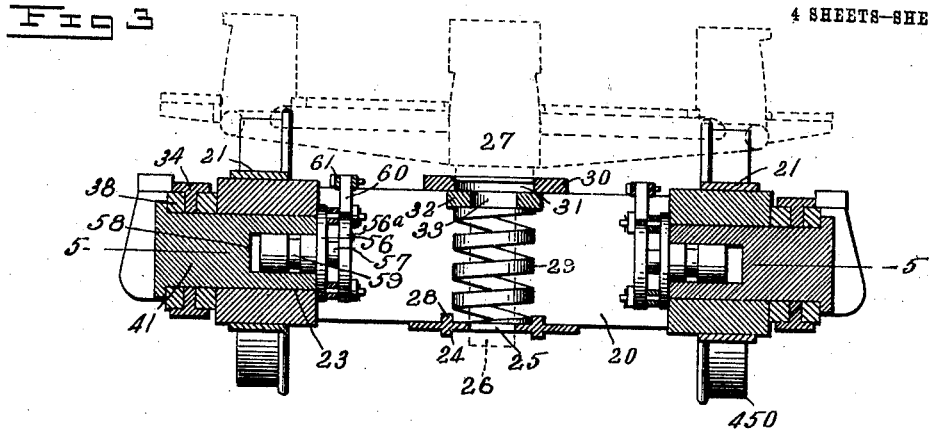
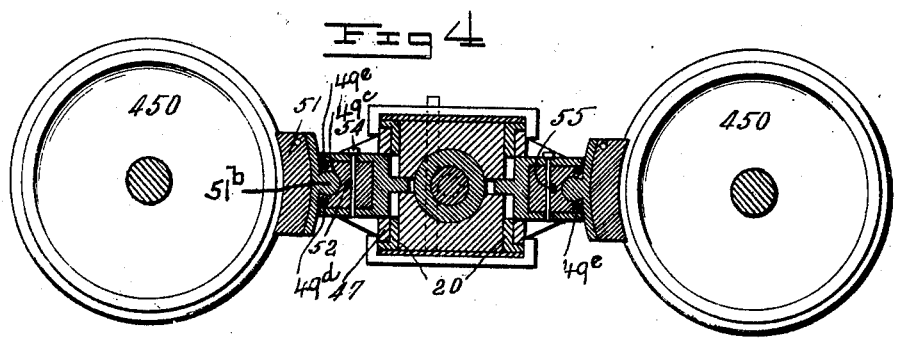
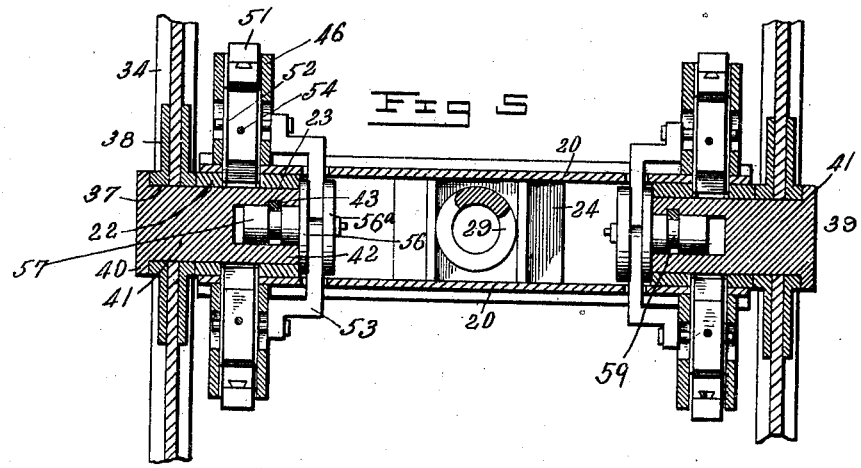
Inventor
H. W. Blake H. W. BLAKE.
CAR TRUCK.
APPLICATION FILED NOV. 23, 1909.
976,843.
Patented Nov. 29, 1910.
4 SHEETS—SHEET 3.
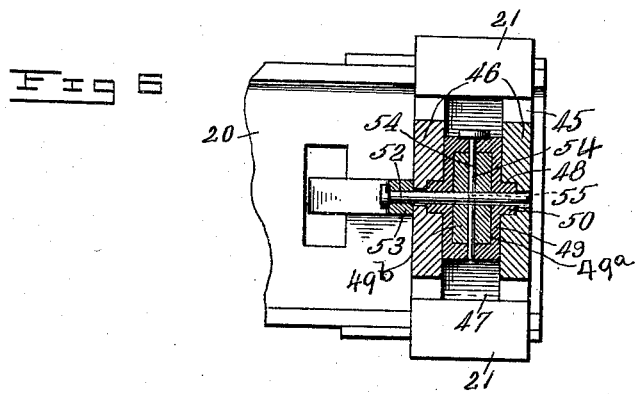
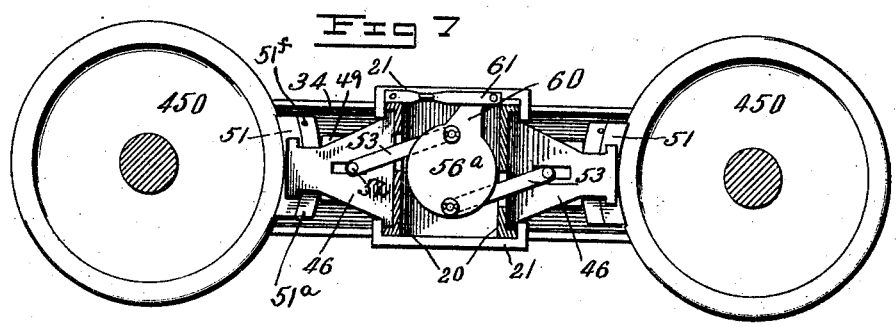
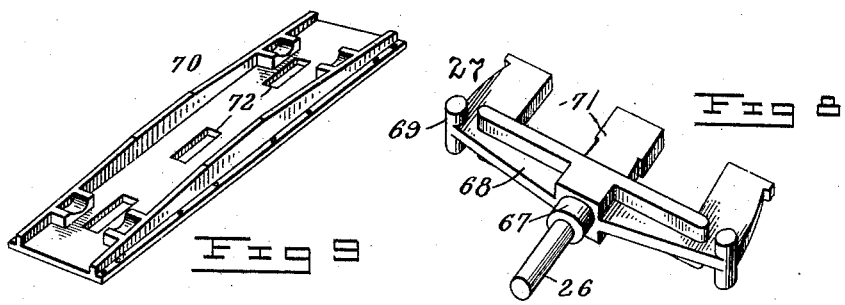
Witnesses
H. G. Roberts
Horace G. Deitz
Inventor
H. W. Blake
By Lungers, Cushman & Co.
Attorney H. W. BLAKE.
CAR TRUCK.
APPLICATION FILED NOV. 23, 1909.
976,843.
Patented Nov. 29, 1910.
4 SHEETS—SHEET 4.
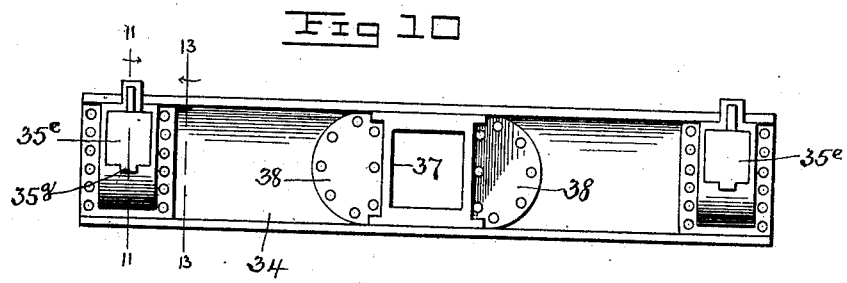
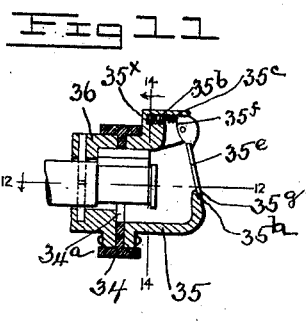
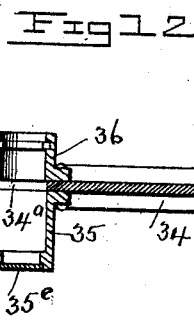
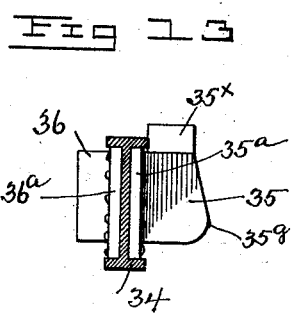
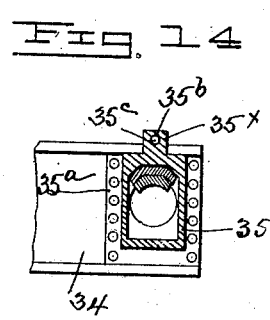
Witnesses
Inventor
H. W. Blake,
By
His Attorney

UNITED STATES PATENT OFFICE.

HENRY W. BLAKE, OF BALL GROUND, GEORGIA.

CAR-TRUCK.

976,843.

Specification of Letters Patent. Patented Nov. 29, 1910.

Application filed November 23, 1909. Serial No. 529,649.

*To all whom it may concern:*

Be it known that I, HENRY W. BLAKE, a citizen of the United States, residing at Ball Ground, in the county of Cherokee and State of Georgia, have invented new and useful Improvements in Car-Trucks, of which the following is a specification.

My invention relates to improvements in car truck and brake mechanism, and has particular relation to the construction and relative arrangement of the elements thereof to provide a mutually supported structure.

One of the principal objects of my invention is to provide a construction in which the side frames of the truck are each removably secured to the bolster at a single point, the positioning means forming the support for the brake-operating mechanism.
A further object of the invention is to provide a construction in which the journal boxes are permanently carried by the side frames of the truck.

A further object is to provide a construction in which the side frames are arranged to have sufficient movement relative to the bolster to permit the wheels to accommodate themselves to inequalities of the roadbed.
A further object is the provision of independent side frames and a bolster, each complete in itself, and a removable connecting member for each side frame and which serves to position the frame and bolster relative to each other.

A further object is to provide a brake mechanism in which the movement of the brake shoes is limited to and positively guided in a single plane.
A further object is to provide a brake operating mechanism supported and positioned by a removable member, the removal of such member retaining the parts of the mechanism in their normal relative positions.

A further object of the invention is to provide a removable king bolt and bolster plate construction co-acting with the bolster to provide relatively flexible connection between the car body and the bolster.

A further object is to provide a mechanism of great strength and durability, which is readily assembled, by means of which the wheels may be readily replaced on a truck in case of accident, which is simple and efficient in operation, and which is relatively of low cost of manufacture.

To these and other ends, the nature of which will be readily understood as the invention is hereinafter disclosed, the invention consists in the improved construction and combination of parts hereinafter fully described, illustrated in the accompanying drawings, and particularly pointed out in the appended claims.

In the accompanying drawings, in which similar reference characters indicate similar parts in each of the several views,—Figure 1 is a plan view of a truck constructed in accordance with my invention, the king bolt and bolster plate being omitted. Fig. 2 is a side elevation of the same, the king bolt and bolster plate being shown in position. Fig. 3 is a central, vertical, transverse sectional view of the truck. Fig. 4 is a sectional view taken on line 4—4 of Fig. 1. Fig. 5 is a sectional view taken on line 5—5 of Fig. 3. Fig. 6 is a sectional view taken on line 6—6 of Fig. 1. Fig. 7 is a sectional view taken on line 7—7 of Fig. 1. Fig. 8 is a detail view of the king-bolt. Fig. 9 is a similar view of the bolster plate. Fig. 10 is a side elevation of one of the side frames removed. Fig. 11 is a vertical sectional view taken on line 11—11 of Fig. 10, the wheel axle being shown in position. Fig. 12 is a horizontal sectional view. Fig. 13 is a vertical sectional view taken on line 13—13 of Fig. 10. Fig. 14 is a sectional view taken on line 14—14 of Fig. 11.

The truck herein described consists of the bolster, the side frames, the connection between the bolster and side frames, and the wheels. These elements are removably connected together to permit of a ready separation of the parts, the construction and relative arrangement of the parts being now described.

The bolster comprises two spaced apart parallel flanged plates or channel bars 20 of a length substantially equal to the distance between the side frames, and of a suitable width, said plates being secured together at their ends by suitable clamps 21, extending across the flanges at the top and bottom of the plates, the space between the plates at each end being filled by a block 22 having an opening 23 to receive the connecting member presently described. Substantially midway of the length of the plates 20, a plate 24 is bolted to the underface of the plates 20, said plate 24 having an opening 25 for the passage of the stud 26 of the king-bolt 27. The plate 24 is also provided on its upper face with cross bars or ribs 28 extending between the plates 20, said ribs forming retaining or positioning members for the lower portion of a spring 29. On the upper face of the plates 20, a plate 30, complemental to and in alinement with the plate 24 is secured, said plate 30 having an opening 31 of larger diameter than the opening 25. Intermediate the plate 30 and the upper end of the spring 29 is provided a washer 32, said washer having an opening 33 through which the stud 26 passes, said washer and spring forming a yielding support for the king-bolt 27.

34, 34, designate the side frames, duplicated in each truck, said frames being preferably of the I-beam shape in cross-section, said frames having journal boxes secured thereto, each box being formed in two parts 35 and 36, secured by bolts or rivets, to the opposite sides of the web of the beam. To permit of the formation of the box in this manner, the beam is formed with an opening $34^a$, restricted to an area which will permit of the passage therethrough of the bearing end of the axle, the brasses, and the journal-box wedge, with the necessary play of the parts in use, the area, however, being not greater than the area of the interior of the box parts on the line of connection with the beam. By this construction, weakening of the beam by the formation of the opening is restricted, while the periphery of the opening is reinforced by the flanged construction of the box parts, the reinforcement being on opposite sides of the beam.

Each part 35 and 36 is of a shape approximating a portion of a journal box, the line of division between the two parts corresponding to a line approximating the center of the usual one-piece box. The inner faces of the parts are provided with peripheral flanges $35^a$ and $36^a$, said flanges being adapted to permit of the securing of the parts to the beam, the flanges being of a width to form an efficient reinforcement as well as securing flanges.

The part 35 of the journal box is formed at its top with an extension $35^x$ within which is formed a recess $35^b$ to receive a spring $35^c$ which serves to normally retain the lid $35^e$ closed, said lid having an ear $35^f$ pivotally secured within the extension, said ear having a shoulder against which the spring is adapted to contact. As shown, the lid is of less area than the area of the front periphery of the part 35, said part being recessed to receive the lid to a depth which will permit the lid, when closed, to lie flush with the face of the part 35, this construction preventing liability of the lid being accidentally opened. To permit of a ready opening of the lid, the latter is provided with a small tongue $35^g$ which enters a recess $35^h$ of the part 35, the tongue and recess being complementally formed to permit of the insertion of a tool or the fingers beneath the tongue to raise the lid. The journals are located approximate the ends of the frame 34, and substantially midway the length of each frame I form a square opening 37 through which the connecting member passes. The frame is reinforced on opposite sides of the beam by reinforcing plates 38. The opening 37, when the side frame is in position, is directly in front of and leads into the opening 23.

The particular construction of the journal box above described is not specifically claimed herein, as it forms the subject-matter of a divisional application filed August 19, 1910, Serial No. 578,003.

The connecting member, designated as 39, is formed with a head 40, a part 41 fitting the square opening 37, and rounded portion 42 adapted to fit the opening 23 of the block 22, said member 39 being adapted to be inserted through the side frame into the block 22, being secured therein by a pin 43 passing vertically through the clamps 21 and through an opening 44, thereby providing a portion having an extended bearing surface to prevent axial movement of the member when the parts are assembled. To permit of a slight pivotal movement of the member 39, the opening 44 is of slightly greater area in cross-section than the area in similar section of the pin 43, this construction permitting of a slight rocking movement of the side frame to provide against jars and strains during the movements of the truck over the track, the strain being such as to provide a flexibility to the frame and the supporting of the car body capable of rocking in rounding curves without lifting to an undue extent upon the truck.

The assembling of the truck requires simply the placing of the axles of the wheels within their journals in the side frames, and the positioning of the bolster to permit of the member 39 being passed through the side frame into the opening 23, after which the pins 43 are placed in position to lock the parts together. It will be obvious that a removal of the pins 43 will permit the parts to become separated.

The particular advantage of this construction lies in the fact that in case the wheels should leave the track during the movements of the truck, it will be necessary only to release a side frame, raise the wheels to proper position, and return the side frame to position; during this operation it will not be necessary to entirely remove the member 39, as the portion 42 thereof is of sufficient length to permit the release of the wheels without withdrawing the member entirely from the opening 23.

As will be seen, the bolster structure is complete in itself and has no part permanently secured thereto which projects into the plane of the side frames, the ends of the bolster simply abutting against the reinforcement of the side frames, the abutting faces being located on a plane extending on or beyond or outside of (but not inside of) the plane of the inner side of the remaining portion of the frame (excluding the journal box structure), the connection and support being provided entirely by the connecting members 39. By this construction it will be obvious that a removal of the connecting members 39 leaves the bolster and side frames absolutely free to be moved relatively to each other and without requiring any relative movement either longitudinally of the bolster or otherwise to permit separation of the parts, the removal of the members 39 entirely eliminating support for the bolster by the side frames. This is of a special advantage in that it permits of a disengagement of the wheel base (composed of the wheels and side frames) from the bolster, as by a jacking up of the car, allowing such wheel base to be moved out of position as a unitary structure, without destroying any of the connections of the brake mechanisms and the car body, the entire brake mechanism remaining with the car during said movement.

While the assembling and manipulation of the truck is thus rendered exceedingly simple and efficient, the stability of the parts is not sacrificed, owing to the fact that the member 39 is of relatively large size, and may be made of a metal of great strength, as well as the fact that said member has an extended bearing within the frame and bolster. Therefore, although the weight of the car is sustained by this member, its particular mounting is such that the ends of the bolster and the face of the said frame coöperate to prevent a bending of the member 39, the possibility of the member 39 being cut or sheared off on the line of the end of the bolster being overcome by the large size and diameter of the member at this point.

While the members 39 serve as connecting members for the parts of the truck, they also serve as bearings and positioning members for the brake operating mechanism, which, with the brake construction, will now be described.

45 designates a member formed of two plates 46 spaced apart but connected at one end, as at 47, said members being four in number, one of which is secured on each side of the bolster at its ends. The plates 46 are each recessed longitudinally to form opposing guide-ways 48 for the brake shoe carriers 49, each of which is provided with oppositely projecting ribs 50 adapted to extend into said recesses, the ribs and recesses providing for a movement of the carriers in a single plane. Each carrier 49 is secured within the plates 46 by a pin 52 projecting through a slot formed in each plate 46, and through an arm 53 of the operating mechanism, said pin 52 being secured in suitable manner, as by a pin 54 extending vertically through the carrier 49 and passing through a recess 55 formed in the pin 52.

As will be understood, the pin 52 serves to limit the movement of the carrier 49, the length of movement of such carriers being not greater than the length of the slots formed in the plates 46.

51 designates the brake-shoe structure and is preferably formed as indicated in Fig. 4 of the drawing. As indicated in said figure, each carrier 49 is recessed longitudinally, as at 49$^a$, the recess being adapted to receive a block 49$^b$ through which the pins 52 and 54 extend. The exposed face of said block is formed with an approximately semi-cylindrical opening 49$^c$ having its axis extending laterally of the carrier. The block is also provided with two recesses 49$^d$, one above and the other below the opening, said latter recesses each being adapted to receive a spring 49$^e$ forming a cushion for the brake-shoe. While I have shown but a single spring as the cushion member, it will be understood that the number may be varied to meet the conditions which may be present in use. Although I have described the opening 49$^c$ as approximately semi-cylindrical, it is to be understood that the open side of the opening is of a length less than the diameter of the opening, thereby providing a partially inclosed opening within which one member, designated as 51$^a$, of the brake shoe is mounted, said member having a rounded head 51$^b$ which is received within the opening by a relative movement of the block and member in directions axially of the opening, the assembling of the parts being had prior to the insertion of the block within its recess, the axial length of the head 51$^b$ corresponding to the axial length of the opening. This particular form of mounting permits of a limited pivotal movement of the member 51$^a$ with the head as the pivot, the movements being cushioned by the springs 49$^e$ which are adapted to abut against the face of member 51$^a$.

The member 51$^a$ is preferably curved as indicated and is provided on its outer face with a dove-tail groove 51$^c$ terminating short of the bottom of the member and adapted to receive a complemental tongue 51$^d$ formed on the member 51$^e$ which provides the actual wheel-contacting portion of the brake-shoe. The tongue and groove connection of the brake-shoe members is of any desired form, I preferring however, to have the direction of vertical length to extend in approximate parallelism with the wheel-contacting face of the member 51$^e$, thereby providing a member which is of substantially equal wearing depth throughout the member and permitting the member to be retained in use until the face of member 51$^a$ is practically reached without affecting the connection of the parts. The member 51$^e$ is secured in position by any form of fastening device, that shown in the drawing being in the form of a pin 51$^f$ extending through the member 51$^a$ above the upper edge of the tongue of member 51$^e$.

By this construction it will be readily understood that the brake-shoe can accommodate itself to the relative movement of the wheels and truck-frame in a vertical direction (the normal planes of the guide-ways 48 and opening 49$^c$ being on approximately the plane of the axis of the wheels), but the tendency to the parts to move under frictional engagement of shoes and wheels is resisted by the structure of the shoe and carrier and the connection of the latter to the truck, this structure providing the equivalent in strength of an integral brake-shoe support, but having adjustability to meet conditions without affecting this strength.

The reciprocating movements of the carriers 49 are provided by the arms 53 pivotally mounted between disks 56 and 56$^a$, said disks being fixedly mounted on a pin 57 the outer end of which extends into a bearing 58 formed in the inner end of the member 39, said pin having an annular groove 59 to permit of the passage of the pin 43, said groove and pin locking the pin 57 against axial movement when the parts are assembled.

As will be seen there is provided a pair of disks 56 and 56$^a$ at each end of the bolster, said disks being located between the plates 20, each pair being adapted to receive the arms 53 for the two brake shoe carriers at the respective ends of the bolster. Said arms 53 extend through the plates 20 from opposite sides of the bolster, and each has its inner end mounted between the disks at a point spaced from the center of the disk, the pair of arms at each end extending on diametrically opposite sides of the center of the disks.

Inasmuch as the disks are pivotally mounted within the bearing formed by the member 39, it will be readily understood that if a pivotal or rotary movement be given to the disks, such movement will cause the arms 53 to be given a substantially reciprocating movement at their outer ends, and as such outer ends are connected to the brake shoe carriers, a corresponding movement will be given to the carriers.

To provide the pivotal movements of the disks, I provide one of each pair (preferably the inner one) with an arm 60 to the outer end of which is pivotally connected a connecting lever 61, the opposite end of which is connected to a lever or arm 62 carried by a rod 63 pivoted within the plates 46, said levers or arms 62 being preferably curved or formed angular in the direction of their length to provide a compact structure. The rod 63 is moved pivotally by means of a lever 64, the free end of which is connected to a brake rod (not shown) which in turn, is connected to a lever, not shown, pivotally mounted in a brake-lever support secured to the car, the lever being operatively connected to the brake actuating mechanism, such as an air brake mechanism, or a hand brake mechanism, or both, as may be desired.

From the above, it will be understood that if the rod 63 be moved pivotally in one direction, the carriers 49 will be caused to move outwardly to place the brake-shoes in contact with the wheels, while if moved in the opposite direction, the shoes will be withdrawn from such contact, but in each case, the movements of the shoes are confined to movements in a single plane, and owing to the location of the guides, the shoes exert their pressure in opposite directions in a line corresponding to the horizontal planes of the axles of the truck, thereby providing an efficient braking effect. It will also be understood that by reason of the mounting of the carrier 49 and its limited movement, the loss of a brake shoe in any manner will not permit the carriers to pass into contact with the tread of the car wheel; hence, wear and breakage of parts other than the shoe itself, is entirely eliminated. Furthermore, it will be understood that inasmuch as the disks are supported solely by the member 39 the weight placed on the bolster will not extend to the brake operating mechanism to any material extent, thereby practically eliminating liability of the operating mechanism being rendered inoperative by the action of the car or bolster, and permitting of the use of relatively light material for this mechanism.

The specific construction of the brake mechanism is described and claimed in my companion application filed November 23, 1909, Serial No. 529,650.

The king bolt 27 is preferably formed as shown in Fig. 8 of the drawings. The stud portion 26 thereof is adapted to extend through the washer 32 and spring 29, the upper end of said stud being expanded in the form of a collar 67, the lower face of which rests on the washer 32, said coller being of a size to pass through the opening 31. The upper portion of the bolt 27 is in the form of an elongated bar 68, the ends of which are formed with circular projections 69 adapted to be received within the recesses formed in the under side of the bolster plate 70. The bolt 27 is also provided with a plurality of upwardly extending projections 71 adapted to extend through openings 72 formed in the plate 70, and pass between the beams of the car body. The plate 70 is formed, as shown in Fig. 9, and is adapted to be secured by bolts to the under face of the car body.

By this construction the car body is supported entirely at one point on each truck, viz.: the center of the bolster frame, the spring 29 forming the cushioning structure, and at the same time providing an extended connection with the car-body through the plate 70, which coöperating with the bolt 27, provides a semi-flexible support, the parts permitting of a limited rocking movement of the body in directions transverse of the truck without lifting the truck from the rails, the outer projections 71 serving to retain the bolt in predetermined position relative to the car-body and preventing relative pivotal movement of these parts, without preventing a rocking movement of the car-body to a sufficient degree. This particular arrangement of the parts provides a placing of the load weight of the car evenly between the wheels of the truck and at the same time provides for the necessary rocking of the car-body without raising the truck while rounding high degree curves, running without rocking on low degree curves and only a partial rocking on intermediate curves, the truck at all times remaining unlifted.

The particular construction of equalizing mechanism, viz., the connections 73, and the king bolt and bolster plate, are not specifically claimed herein as they form the subject matter of my companion application filed November 23, 1909, Serial No. 529,651.

It is to be understood that wherever found necessary cotter pins will be made use of for the purpose of retaining pins and other removable parts in position and against separation. Furthermore, it is to be understood that where necessary, parts will be riveted together to retain them in permanent engagement.

Having thus described my invention, what I claim as new is:

1. A truck comprising a bolster, side frames in facial contact with the bolster approximately centrally of the frames, each frame having its bolster-contacting face on a plane extending on or outside of the plane of the side of the main remaining portion of the frame, wheels carried by the frame, and means removable from both parts for securing the side frames to the bolster, said means supporting and positioning the bolster within the truck, the particular location of the contacting faces of the bolster and frames permitting a free disengaging movement of these parts without necessitating relative movements in directions longitudinally of the bolster.

2. A truck comprising a bolster, side frames in facial contact with the bolster approximately centrally of the frames, each frame having its bolster-contacting face on a plane extending on or outside of the plane of the side of the main remaining portion of the frame, wheels carried by the frame, and means removable from both parts for securing the side frames to the bolster, said means supporting and positioning the bolster within the truck, the particular location of the contacting faces of the bolster and frames permitting a free disengaging movement of these parts without necessitating relative movement in directions longitudinally of the bolster, said frames being removable independently of one another.

3. A truck comprising a bolster, side frames in facial contact with the bolster approximately centrally of the frames, each frame having its bolster-contacting face on a plane extending on or outside of the plane of the side of the main remaining portion of the frame, wheels carried by the frame, and means removable from both parts for securing the side frames to the bolster, said means supporting and positioning the bolster within the truck, the particular location of the contacting faces of the bolster and frames permitting a free disengaging movement of these parts without necessitating relative movements in directions longitudinally of the bolster, said bolster and said means forming the sole connection of one side frame with the other.

4. A truck comprising a bolster, side frames in facial contact with the bolster approximately centrally of the frames, each frame having its bolster-contacting face on a plane extending on or outside of the plane of the side of the main remaining portion of the frame, wheels carried by the frame, means for removably securing the side frames to the bolster, said means supporting and positioning the bolster within the truck, the particular location of the contacting faces of the bolster and frames permitting a free disengaging movement of these parts without necessitating relative movements in directions longitudinally of the bolster, said means including a bearing formed in the end of the bolster, and a connecting member extending through the side frame and removably secured within the bearing.

5. A truck comprising side frames, and a bolster located between said frames, said bolster being of a length equal to but not greater than the distance between said frames, said bolster and frames being free from inter-engagement means being provided for removably securing each side frame to the bolster.

6. A truck comprising side frames, and a bolster located between the side frames, said bolster being of a length equal to but not greater than the distance between said frames, said bolster and frames being free from inter-engagement and means removable from the side frame and bolster for removably securing each side frame to the bolster.

7. A truck comprising a bolster having its ends provided with bearings, side frames each having an opening adapted to register with the opening of the bearings, and a connecting and supporting member fitting the opening of the side frame and said bearing, said member being movable axially to connect the frame and bolster when the latter are in their relative positions for use, the movement of said members to release the connection freeing the bolster from support by the side frames, and removable means for retaining said connecting member in predetermined position.

8. A truck comprising a bolster, side frames, and means for removably securing each side frame with the bolster, said bolster having an over-all length equal to but not greater than the distance between the side frames, said means normally preventing a separation of bolster and side frame, said means also providing for a limited pivotal movement of the side frame relative to the bolster.

9. A truck comprising a bolster having its ends formed with cylindrical bearings, side frames each having an opening adapted to register with a bearing, said opening being of angular configuration, and a connecting member movable axially of said opening and bearing, said member having a configuration to complementally fit the opening and bearing, said member normally retaining the bolster and side frame from separation.

10. A truck comprising a bolster having its ends formed with cylindrical bearings, side frames each having an opening adapted to register with a bearing, said opening being of angular configuration, and a connecting member movable axially of said opening and bearing, said member having a configuration to complementally fit the opening and bearing, and means for retaining said member in predetermined position to prevent axial movement thereof.

11. A truck comprising a bolster having its ends formed with cylindrical bearings, side frames each having an opening adapted to register with a bearing, said opening being of angular configuration, and a connecting member movable axially of said opening and bearing, said member having a configuration to complementally fit the opening and bearing, and means for retaining said member in predetermined position to prevent axial movement thereof, said latter means including a pin removably extending through the bolster and member.

12. A truck comprising a bolster, side frames, means for removably securing each side frame to the bolster, and brake and brake operating mechanism, said securing means forming the support for the brake operating means.

13. A truck comprising a bolster, side frames, a connecting member for removably securing a side frame to the bolster, and brake and brake operating mechanism, said brake mechanism being supported by the bolster, the brake operating mechanism being supported by the connecting means.

14. A truck comprising a bolster having its ends formed with bearings, side frames, connecting members for removably securing each side frame to the bolster, said members extending within said bearings, brake mechanism, and brake operating mechanism pivotally mounted and having its pivot members extending within and supported by said members.

15. A truck comprising a bolster having its ends formed with bearings, side frames, connecting members for removably securing each side frame to the bolster, said members extending within said bearings, brake mechanism, and brake operating mechanism pivotally mounted and having its pivot members extending within and supported by said members, and means for removably retaining said members and the brake operating mechanism against a separating movement.

16. In a car truck, a bolster, and side frames removably secured thereto, said bolster having an over-all length equal to but not greater than the distance between the side frames the connection of said frames and bolster permitting a limited relative rocking movement of the bolster and frames.

17. In a car truck, a bolster, and side frames removably secured thereto, said bolster having an over-all length equal to but not greater than the distance between the side frames the connection of said frames and bolster permitting a limited relative rocking movement of the bolster and frames with the bolster as the pivot-positioning member.

18. In a truck, a bolster, side frames, and means for removably securing the bolster and said frames together, said bolster having an over-all length equal to but not greater than the distance between the side frames said means permitting a limited relative rocking movement of the bolster and frames.

19. In a truck, a bolster, side frames, and means for removably securing the bolster and said frames together, said bolster having an over-all length equal to but not greater than the distance between the side frames said means permitting a limited relative rocking movement of the bolster and frames, said means providing the pivot member for the rocking movement.

20. In a truck, a bolster, side frames, connecting members for the side frames and bolster, brake-shoe operating mechanism, and means for removably securing said mechanism to said members, the securing of the mechanism locking the bolster and side frames against separation.

21. In a truck, a bolster, side frames, connecting members for the said frames and bolster, brake-shoe operating mechanism removably secured to said members, and pins for securing the members and mechanism together.

22. In a truck, a bolster, side frames, connecting members for the said frames and bolster, brake-shoe operating mechanism, and means for removably securing said mechanism to said members, the securing of the mechanism locking the bolster and said frames against separation, said means including an element pivotally mounted within each member and adapted to impart reciprocations to the brake-shoes.

23. A truck comprising a bolster, side frames, said bolster and frames being substantially free from interengagement, and independent means for removably securing the bolster and frames together.

24. A truck comprising a bolster, side frames, said bolster and frames being substantially free from interengagement, and independent insertible means extending through the side frames and into the bolster for removably securing the bolster and each of the frames together.

25. A truck comprising a bolster, side frames, said frames and bolster normally having a contact one with the other, such contact permitting a relative movement in a direction transversely of the bolster, and independent means for removably connecting the bolster and frames to normally retain them against such transverse relative movement.

26. A truck comprising a bolster, side frames, said frames and bolster normally having a contact one with the other, such contact permitting a relative movement in a direction transversely of the bolster, and independent means for normally securing the bolster and side frames against such relative and separating movements.

27. In a truck, a bolster embodying parallel beams having their ends permanently connected by spacing members, side frames abutting against the outer ends of said spacing members, and means extending through the side frames and into the spacing members for removably securing the side frames to said bolster.

28. In a truck, a bolster comprising parallel beams having their ends permanently connected by spacing members, side frames of I-beam construction in cross-section, each frame abutting against the outer end of a spacing member, and means extending through the side frames and into the spacing members for removably securing the side frames to said spacing members.

29. In a truck, a bolster comprising parallel beams, having their ends permanently connected by spacing members, side frames of I-beam construction in cross-section, each frame having a central opening with reinforced walls, the inner face of the walls abutting against the outer ends of said spacing members, and means extending through the said frames and into the spacing members, for removably securing the side frames to said spacing members.

30. A truck comprising a bolster, side frames, wheels carried by the frames, and means for independently securing the side frames to the bolster, said means supporting and positioning the bolster within the truck, said bolster having an over-all length equal to but not greater than the distance between the side frames, and being free from interengagement with said frames.

31. A truck comprising a bolster, side frames, wheels carried by the frames, and a connecting member for removably securing each side frame to the bolster, said members supporting and positioning the bolster within the truck, said bolster having an over-all length equal to but not greater than the distance between the side frames, and being free from interengagement with said frames.

32. In a truck, a bolster, and side frames removably secured to said bolster, said bolster having an over-all length equal to but not greater than the distance between the side frames, and being free from inter-engagement with said frames.

33. In a truck, a bolster, side frames, said bolster and frames having faces adapted to abut one with the other but not interengage, and means insertible through each side frame and into the bolster for securing the bolster and side frames together.

In testimony whereof I have hereunto set my hand in presence of two subscribing witnesses.

HENRY W. BLAKE.

Witnesses:
BYRON THURMAN,
ARTHUR THURMAN.